United States Patent [19]

Wilcox

[11] 3,750,148

[45] July 31, 1973

[54] PULSE CODING SYSTEM

[75] Inventor: Jack E. Wilcox, Garrett, Ind.

[73] Assignee: The United States of America as represented by the Secretary of the Air Force, Washington, D.C.

[22] Filed: May 11, 1966

[21] Appl. No.: 549,778

[52] U.S. Cl. .................... 340/351, 325/143

[51] Int. Cl. .................... G08c 13/00

[58] Field of Search .................... 340/351; 325/33, 325/40, 143

[56] References Cited

OTHER PUBLICATIONS

Greenberg, "Handbook of Telemetry and Remote Control," 1967, Pg. (2–5) (2–6) (2–22) (2–35) (2–41) (9).

*Primary Examiner*—Benjamin A. Borchelt
*Assistant Examiner*—N. Moskowitz
*Attorney*—Harry A. Herbert, Jr. and Eugene J. Pawlikowski

[57] ABSTRACT

An encoder and cooperating decoder for the individual bits of serial binary information designed to increase the difficulty of jamming a communication system. In the encoder, the digital signal is applied to a tapped delay line with the signal at each tap used to key "on" a normally "off" oscillator and key "off" a normally "on" oscillator, all oscillators being of different frequencies and their outputs being applied to a common output circuit. At the decoder the oscillator signals are separated by frequency selective detectors the outputs of which are sampled in a prescribed manner to determine whether a binary "1" or a binary "0" was sent.

1 Claim, 9 Drawing Figures

INVENTORS
JACK WILCOX
BY Harry A. Herbert Jr
ATTORNEY
Eugene J. Pawlikowski
AGENT

| 81 \ 80 | — | 1 |
|---|---|---|
| — | — | 1 |
| 1 | 0 | U |

INPUT VS. OUTPUT DECISION CIRCUITS 92-96

| 115 \ 114 | — | 1 | 0 | U |
|---|---|---|---|---|
| — | — | — | — | — |
| 1 | — | 1 | — | 1 |
| 0 | — | — | 0 | 0 |
| U | — | 1 | 0 | U |

INPUT VS. OUTPUT DECISION CIRCUITS 102-104

| 124 \ 118 | — | 1 | 0 | U |
|---|---|---|---|---|
| — | — | — | — | — |
| 1 | — | 1 | — | 1 |
| 0 | — | — | 0 | 0 |
| U | — | 1 | 0 | — |

INPUT VS. OUTPUT DECISION CIRCUIT 105

INVENTORS
JACK WILCOX
BY Harry A. Herbert Jr
ATTORNEY
Eugene J. Pawlikowski
AGENT INVENTORS
JACK WILCOX
BY Harry A. Herbert Jr
ATTORNEY
Eugene J. Pawlikowski
AGENT

PULSE CODING SYSTEM

This invention relates to a pulse encoding device for use in communications systems in general and, particularly, in ground-to-air data links such, for example, as the radio control of an aircraft committed to air defense in the face of enemy jamming.

In digital communications systems of the type employing a binary code pulse train, many complications can be avoided if the receiver is able to operate without tight synchronization of carriers or any other time standard between the transmitter and receiver. Also, if asynchronous communication is to be employed, various safeguards must be considered in order to ensure effective communication under adverse ECM conditions.

Accordingly, an object of this invention is to provide a pulse communication system which causes binary pulse identification through novel encoding and decoding means at the transmitter and receiver ends of the data link, respectively.

Another object of the invention is to provide a pulse communication system wherein messages comprising a binary-code pulse train are provided considerable defense against the possibility of enemy jamming.

Other objects and characteristic features of the invention will become apparent as the specification proceeds.

Figure 1:
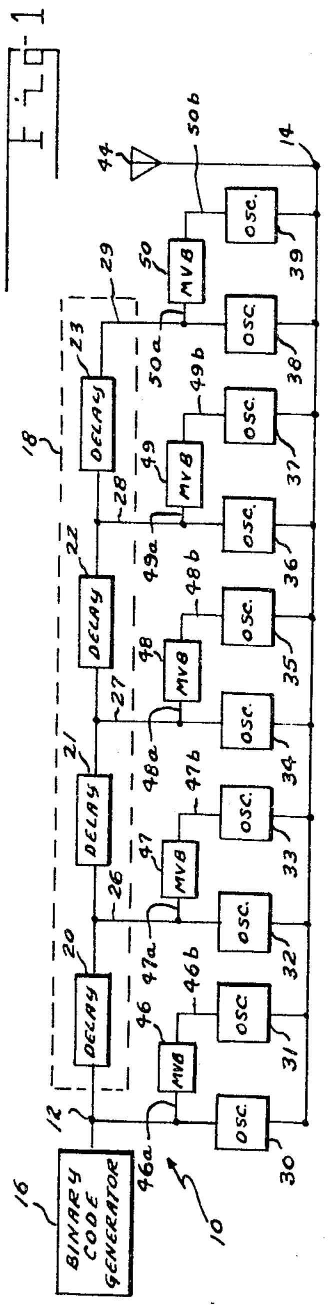
FIG. 1 is a block diagram of the transmitter portion of the invention embodiment.

Referring to FIG. 1, a transmitter encoder generally referenced 10 comprises an input terminal 12 and an output terminal 14. The message input to encoder 10 is of the binary form and may be, for example, the binary signal shown in FIG. 2, as produced by a binary code generator 16. A typical message is made up of two types of pulses consisting of *n* bits of binary logic, each bit being a "1" or a "0" according to customary logic notation. To develop the binary logic briefly, by reason of the on-off character of the pulses, the location of a pulse defines a "1" bit and, where a pulse position is blank in the time sequence, the location of the binary bit "0" is assumed. The arrangement of the 1's and 0's in the binary intelligence expressed by FIG. 2 thus, for example, is a code pulse group which represents some part of the message signal.

The digital signal is applied to a conventional lumped-constant delay line 18 which includes four delay units 20, 21, 22 and 23 in cascade arrangement. Four output taps 26 through 29 are provided. For the system to be described, the delay introduced by each delay unit is the same and is determined by the pulse width of each "1" and "0" pulse fed to terminal 12. With a fixed pulse length for the "1" and "0" bits, for example, on the order of 200 microseconds, each delay unit imposes a delay of 200 microseconds on each pulse traveling along delay line 18.

Each pulse applied to input terminal 12 is subsequently applied to a plurality of oscillator channels 30 through 39, each of which comprises a conventional oscillator of the type that, with a proper trigger pulse, a frequency of oscillation is produced for the duration of the pulse. Each oscillator channel oscillates at a center frequency different from the frequency of the other channels. Frequency discrimination between the channels thus is provided. The output signal of each channel is coupled via output terminal 14 to an antenna 44 on which the encoded output signal appears.

Continuing with FIG. 1, it can be seen that the input signal will be divided in power among the oscillator channels at all times. The channels are arranged in complementary pairs 30–31, 32–33, 34–35, 36–37, and 38–39, with the channels making up each pair having their input leads connected by NOT elements 46 through 50 which, for example, may be multivibrators. As used herein, the complementary association of the paired channels means that if, for example, channel 30 is producing an output signal then, due to the activity of NOT multivibrator 46, no output signal is produced by channel 31, and vice versa. NOT multivibrators 47 through 50 are similarly arranged to permit only one of two complementary channels to operate at a given time.

Flip-flop circuits of monostable design are suitable for use in each of the NOT circuits. Basing an illustration on MVB circuit 46, previous to the presence of a trigger pulse on input terminal 12, which is a "0" signal by the convention previously adopted, channel 30 is inoperative whereas channel 31 is operating due to a relatively high forward biasing potential on lead **46*b*. It now will be assumed that an external trigger denoted by a "1" is applied to lead 46*a*. Channel 30 will be excited into oscillation. Since the trigger is concurrently applied to MVB 46, this circuit switches to its other state. The reversal of conditions in MVB 46 produces a relatively high negative bias potential on lead 46*b*. This bias places channel 31 in an inactive state which persists for the duration of the trigger pulse. Thus, during the presence of a signal on line 46*a*, it will be appreciated that the negative bias potential terminates the operation of channel 31, with channel 30 meanwhile operating to feed an oscillatory signal of predetermined frequency to antenna 44.** The operation of the MVB circuits to control which of two paired channels is to furnish a signal identified by its frequency will thus be entirely understood by those skilled in the art without their further detailed elaboration.

Figure 2:
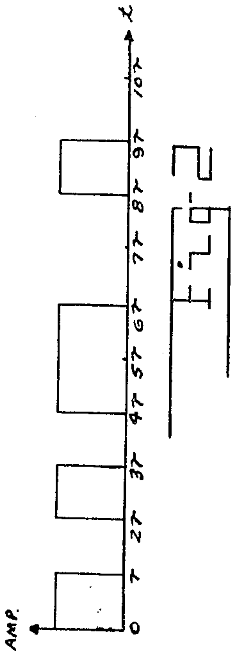
FIG. 2 shows a typical binary-coded signal.
Figure 3:
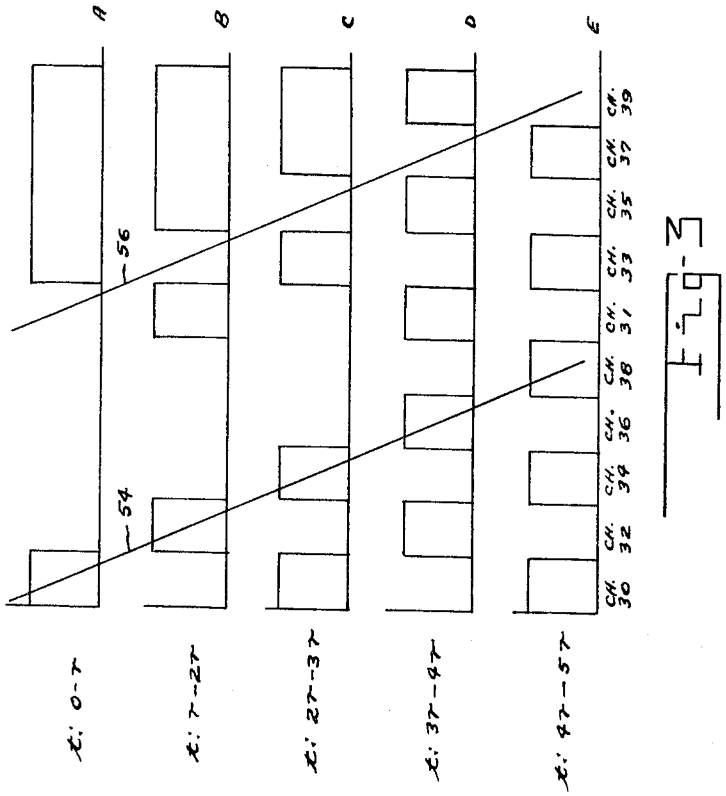
FIG. 3 illustrates representative binary bits which demonstrate transmitter encoding in the FIG. 1 circuit.

To further develop the transmitter end of the present invention, reference is made to FIG. 3. Let it be assumed that the binary signal shown in FIG. 2 becomes available at input terminal 12. Starting at $t = 0$, the first bit to arrive in the illustration taken is a binary bit "1" and it exists for the period beginning at $t = 0$, $t = \tau$, *where τ refers to a delay period* 200 microseconds in duration. FIG. 3A shows the state of each of the ten channels for the interval taken up by the first "1" bit. Outputs at this time are produced by channels 30, 33, 35, 37 and 39 but not from channels 31, 32, 34, 36 and 38. Channels 32, 34, 36 and 38 are disabled through lack of a pulse at taps 26 through 29. Channel 31 is disabled by MVB circuit 46 as explained above in connection with the detailed illustration of the MVB function.

After a period $\tau$ introduced by delay unit 20, the "1" bit advances to input tap 26 and exists there for a period covered by the interval $t = \tau$, $t = 2\tau$. This is best seen in FIG. 3B. Removal of the pulse from line 46*a* disables channel 30 and permits enabling of channel 31 by MVB 46. At the same time, channel 31 joins the list of those producing an output signal whereas channel 33 ceases to deliver an output signal. The progression of the first bit may be followed in FIG. 2C but now a second "1" bit separated from the first "1" bit by a "0" bit becomes available at input terminal 12. Thus, for the period $t = 2\tau$, $t = 3\tau$, and with two delay periods completed, an output now exists from channels 30, 34, 33, 37 and 39 and no outputs from complementary channels 32, 36, 38, 31 and 35 for the same period. With the end of the third delay period, i.e., the delay introduced by delay unit 22, the conditions denoted by FIG. 3D apply. Output signals are produced by channels 32, 36, 31, 35, and 39.

Assuming now that all four of the cascaded delays have detained the first "1" bit of the binary signal, reference is made to FIG. 3E where, as can be seen, the third "1" bit (shown in FIG. 2 covering a period of $2\tau$) in the serially aligned input signal moves onto input terminal 12. Accordingly, for the period $t = 4\tau$, $t = 5\tau$, only channels 30, 34, 38, 33, and 37 produce an output signal. Complementary action of the MVB circuits disables channels 32, 36, 31, 35 and 39.

Summarizing FIGS. 1, 2 and 3, it can be seen that for a given number of channels available for encoding the binary input signal, one-half are in operation at one time whereas the other half is inactive. Hence, the outputs of the even-numbered channels are made complementary to the outputs of the odd-numbered channels, respectively. The progression of channel activity in response to the step-by-step route of the first bit is evident from viewing the line 54 (FIG. 3) which diagonally traces the successive development of output signals from the even-numbered channels at 200 microseconds intervals, and the line 56 which traces the complementary development of inactive conditions in the odd-numbered channels in response to the same input pulse.

Figures 4, 5, 6, 7:
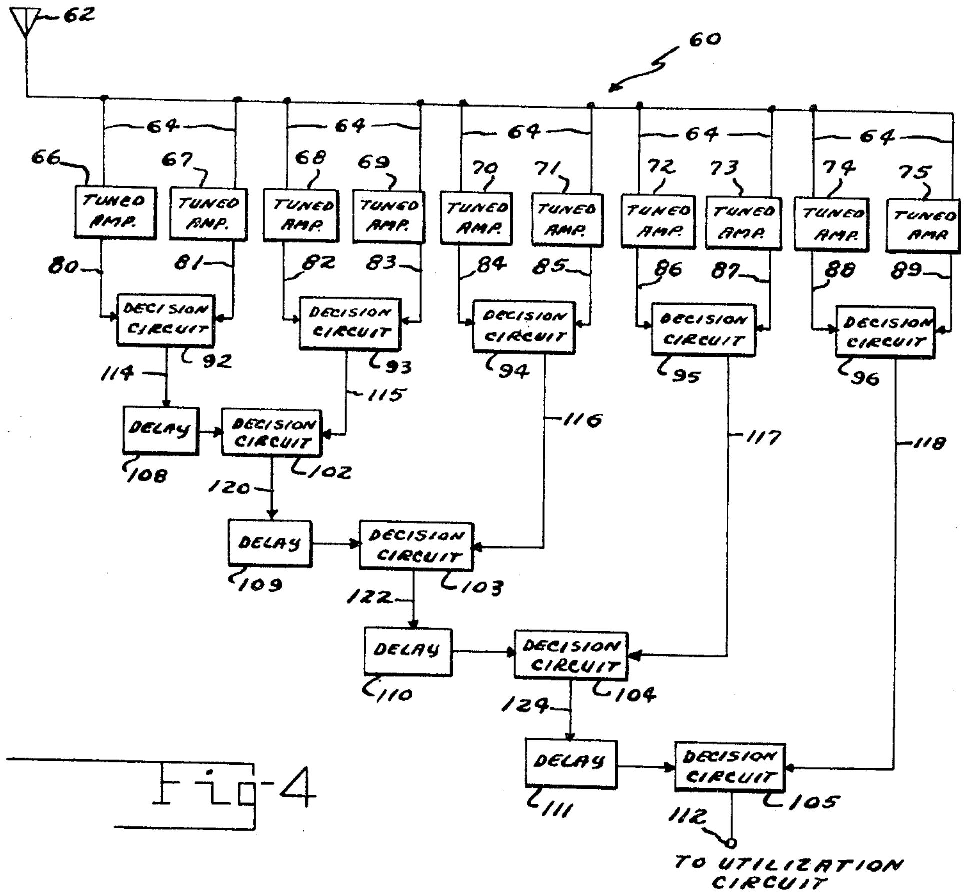
FIG. 4 is a block diagram of the receiver portion of the invention embodiment.
FIGS. 5, 6 and 7 are decoding tables which assist in understanding the decoding operation of the receiver circuit.

Turning now to FIG. 4, the manner in which the signal transmitted from encoder 10 is decoded will now be considered. In the receiver generally designated 60, the multiple frequency-selective signals received by antenna 62 are fed, by means of lines 64, to a plurality of filter and detector channels 66 through 75 which may, for example, be tuned amplifiers each of which is tuned to the center of a predetermined frequency range. It can be seen that the number of receiver channels equals the number of oscillator channels found in the transmitter embodiment described in connection with FIG. 1. Channels 66 through 75 perform the frequency detection function with respect to oscillators 30 through 39, respectively, in order to determine, of the five signals received at any one time, the carrier frequencies identifying each oscillator channel. Any wave energy within the pass band of a given amplifier 66 through 75 will produce a voltage on a corresponding one of a plurality of output leads 80 through 89, respectively, five of which will be showing a voltage at all times when the transmitter is operating.

The complementary association of the oscillator channels explained hereinabove is carried over and applied to the tuned amplifier channels 66 through 75.

For example, the complementary tuned amplifier channels are as follows: 80–81, 82–83, 84–85, 86–87, and 88–89. Using channels 80 and 81 as an illustration, at some time during the application of a binary coded input, if an output exists on line 80 from channel 66, no output exists on line 81 by virtue of their complementary relationship of oscillator channels 30 and 31. The same applies to the remaining amplifier channels so that if, for example, if the even-numbered channels of the amplifier group are producing an output signal then, due to the complementary effect of the MVB circuits in the transmitter, no output signal is issuing from the odd-numbered channels of the same group, and vice versa.

Amplifier channels 66 through 75 have bandwidths identical to each other, the bandwidth being determined by and equal to the pulse width of the incoming binary-coded signals and, hence, being on the order of 5 kc for a pulse width of 200 microseconds.

Accordingly, it will be seen that the tuned-amplifier channels shown in FIG. 4 may be grouped into five pairs with the output signals of each pair having a complementary relationship. The outputs of these amplifiers are channeled into one bank of suitable decision circuits 92 through 96 of the type known to those skilled in the art for producing one of several pulses depending on what input signals are applied to the two input leads of each decision circuit. Other decision circuits 102 through 105 are arranged as part of a second bank and complete the decoding function. It can be seen that the outputs of decision circuits 93, 94, 95 and 96 are applied to decision circuits 102, 103, 104 and 105, respectively, as one input thereto. The second input to decision circuit 102 is taken from decision circuit 92 but is delayed in a delay unit 108 for a period of 200 microseconds, i.e., a delay which is the same as that introduced by each section of delay line 18 in the transmitter encoder of FIG. 1. In a similar manner, delay units 109, 110 and 111, each introducing equal delays of 200 microseconds, are arranged between the following decision circuit pairs: 102–103, 103–104, and 104–105. An output means is represented by a terminal 112, which normally will extend to a code utilization device not shown.

In order to more fully understand the decoding operation of receiver 60, which will now be taken up in greater detail, reference is made to FIGS. 5, 6 and 7. In FIG. 5 there is shown a table of representative output signals versus input signals for each of the decision circuits 92 through 96. The input leads to decision circuit 92 are given by way of example. A table similarly arranged is shown in FIG. 6 and represents the effect of various input signals on decision circuits 102, 103 and 104. Here the input leads 114 and 115 to decision circuit 102 carry the illustration. The third table, FIG. 7, represents the response of decision circuit 105 from whence a replica of the encoded signal appears at output terminal means 112. The notation adopted in FIGS. 5, 6 and 7 for each of the possible output signals is the same. Thus, a "1" denotes a "1" output signal, a "0" denotes a "0" output signal, and a U denotes the situation when, inconsistent with the complementary operation of each pair of tuned amplifiers 66 through 75, either "1" type signals or "1" type signals are simultaneously applied to the two leads forming the input terminal means of each decision circuit. Thus, a U output signal means simply that the circuit is undecided; however, a signal is passed to the next decision circuit instructing it to attempt to decide what signal has been sent. Where a block shows a dash (—), this means that no signal has been received and no instruction is transmitted.

Assume now that a binary signal of the type shown in FIG. 2 is incident on antenna 62 of receiver 60. For ease in the illustration, assume further that this signal consists of a single "1" bit of 200 microseconds duration, i.e., the first bit shown in FIG. 2. Accordingly, referring to FIG. 3A, oscillator 30 will produce a "1" bit pulse during the interval 0–τ. Channels 33, 35, 37 and 39 also are active in producing an output signal. The signal from channel 30, being within the bandwidth of amplifier channel 66, an output is produced on line 80. Since amplifier 67 must necessarily be inactive at this time, it can be seen, referring to FIG. 5, that the output signal from decision circuit 92 on line 114 is indicative of a "1" input. It will be appreciated that simple rectangular coordination is used in FIGS. 5, 6 and 7 to determine the output signal.

At the end of the period 0–τ, the signal, delayed by delay unit 108, is applied to decision circuit 102. At the same time, referring to FIG. 3B, it can be seen that the original "1" bit signal is transmitted by oscillator 32. It follows that amplifier 67 derives an output signal, complementary amplifier 66 does not. This leaves decision circuit 102 fed with two signals indicative of "1" signals. From FIG. 6, it can be seen that the signal appearing on output lead 120 from decision circuit 102 is also a "1" signal. At the end of the interval 2τ the signal applied to delay unit 109 arrives at decision circuit 103. Simultaneously, by virtue of the delays imposed by delay units 20 and 21 in encoder 18, activity in oscillator 34 begins which produces a signal at antenna 62. Channel 70 therefore applies a signal through decision circuit 94 with no delay and, in turn, this signal is applied to decision circuit 103 simultaneously with the application of the delayed pulse from delay unit 109. This produces a "1" output signal from decision circuit 103, as reference to the table in FIG. 6 shows. As the "1" signal from delay unit 110 arrives at decision circuit 104, a "1" signal is also applied to the other input terminal of decision circuit 104. This second signal arises in decision circuit 104 by virtue of the response in oscillator 36 to the thrice delayed encoded signal which falls now within the bandpass of channel 72. Accordingly, two "1" signals are applied to decision circuit 104 from which a "1" signal, after a fourth delay in delay unit 111, is applied to decision circuit 105.

Referring again to FIG. 3E, it will be appreciated that during the period 4τ– 5τ, a "1" signal is produced in channel 38. Being within the bandpass of channel 88 in receiver 60, this signal is applied to decision unit 96 which, in turn, applies a "1" signal over line 118 to decision circuit 105. Now provided with two "1" inputs simultaneously, decision circuit 105 produces a "1" signal on output terminal means 112. This output signal represents the input binary "1" signal assumed previously to form the input signal in the illustration taken.

At this point, it will be understood that to decode a binary "1" signal that has been encoded in transmitter 18, receiver 60, to indicate that a "1" signal has been sent, must fulfill the following two conditions: (1) a "1" signal must be present successively in the even-numbered amplifier channels at 200 microseconds intervals and (2) a "0" signal must be present successively in the odd-numbered amplifier channels during the proper time interval.

Figure 8:
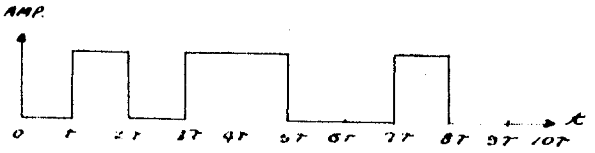
FIG. 8 shows a second typical binary-coded signal.
Figure 9:
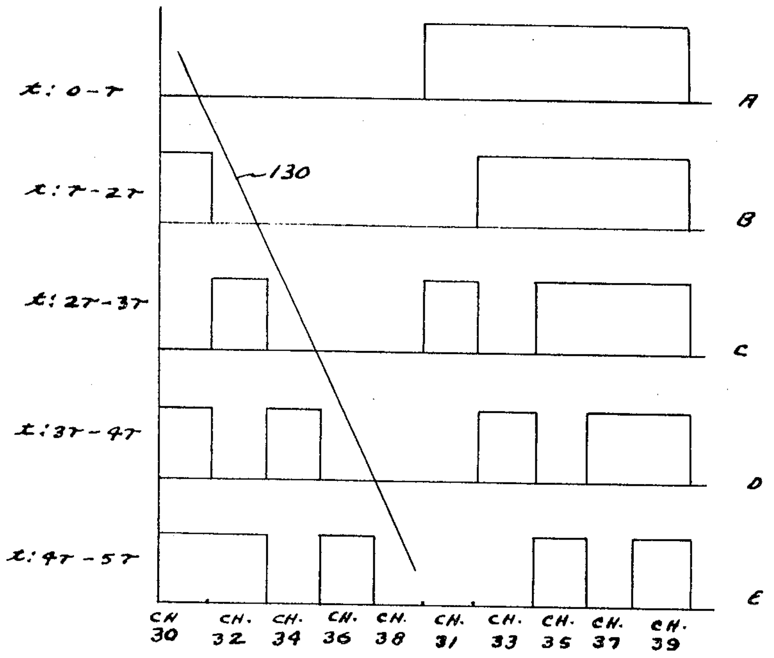
FIG. 9 shows the signal of FIG. 8 encoded according to the invention.

The response of receiver 60 to the transmission of a "0" signal present in a binary signal can readily be understood in view of the discussion already devoted to its response to a "1" signal encoded by transmitter 18. The conditions necessary in the receiver to indicate that a "0" has been sent are as follows: (1) a "0" signal must be present in one of the even-numbered amplifier channels during the proper time interval, and, (2) a "1" signal must be present successively in the odd-numbered amplifier channels at 200 microseconds intervals. To develop this response to "0" signals slightly further, reference is made to FIG. 8 and 9. FIG. 8 shows a binary-coded signal identical to that shown in FIG. 2 except for a time shift of τ in order to place a "0" bit at the start of the input signal. FIG. 9 shows the encoding function in response to this signal and, therefore, is like FIG. 3 in this respect. Accordingly, with the graphical support of FIGS. 8 and 9 in mind, during the interval $t = 0$, $t = \tau$ the odd-numbered oscillator channels are producing an output signal. The even-numbered oscillator channels are not. In the receiver, a "0" signal exists on lines 80, 82, 84, 86 and 88 and "1" signals exist on lines 81, 83, 85, 87, and 89. Decision circuits 92 through 96 produce "0" output signals, reference being made to the tabulation in FIG. 5. After being delayed for 200 microseconds in delay unit 108, the "0" signal is applied to decision circuit 102 and, after three successive delays of 200 microseconds each, the "0" signal is applied to decision circuit 105. Thus, with decision 96 still producing a "0" signal, decision circuit 105 produces a "0" signal which is fed to output terminal 112. In operation, therefore, in response to an encoded "0" pulse fed to antenna 62, a decoded "0" pulse will be applied to the utilization circuit. The specific example of receiver operation just described is borne out further by the diagonal line 130 which traces the successive passage of a "0" input signal through encoder 18. Its subsequent reappearance in decoded form at output terminal 112 after being committed to successive delay periods totalling 800 microseconds is apparent from the description hereinabove given.

To prevent an enemy from discovering which channels are going to be used, the frequency of each channel 30 through 39 may be changed from time to time while keeping in mind that corresponding frequency changes must be made in the receiver channels to secure frequency agreement between he transmitter and the receiver. To obtain further immunity to jamming, as many channels as may be desired may be used, ten at a time, in the transmitter and the receiver. The bandwidth allotted to the communication system also determines the number of available channels. For example, with an assigned bandwidth of 4 mc, and information in the form of bits 200 micronseconds in duration to produce a channel width of 5 kc, channels in the number of 800 become possible. Thus, by analyzing the message and noting which channels have carried information in their lack of producing a signal, the maximum number of new channels required for the next message is 5 per bit. In other words, those five channels whose outputs showed a "0" input may be used again to make up the ten channels needed for the next encoding and decoding operation.

Although only one embodiment of the invention has been illustrated and described, it will be apparent to those skilled in the art that various changes and modifications may be made therein without departing from the spirit of the invention or the scope of the appended claims.

I claim:

1. An encoder and cooperating decoder for the individual bits of serial binary information in which the "1" bit is represented by a signal of duration T and the "0" bit is represented by the absence of a signal during an interval T, said encoder comprising: a delay network having at least three taps at delay intervals T, including a tap at zero delay; means for applying said bits to said zero delay tap; a pair of oscillators coupled to each of said taps, the first oscillator of each pair being normally nonoscillatory and being rendered oscillatory during the presence of a signal at said tap and the second oscillator of each pair being normally oscillatory and being rendered nonoscillatory during the presence of a signal at said tap, said oscillators all having different oscillating frequencies; and means coupling said oscillators to a common output circuit; and said decoder comprising: an input circuit coupled through a suitable transmission link to said common output circuit; a pair of frequency selective detectors corresponding to each of said pairs of oscillators, the first and second detectors of each pair being selective of the frequencies of the first and second oscillators respectively of the corresponding oscillator pair, each detector having an input circuit and an output circuit; means connecting all detector input circuits in parallel to said decoder input circuit; a Type I decision circuit corresponding to each of said detector pairs, each Type I circuit having a first input circuit coupled to the output circuit of the first detector of its corresponding detector pair, a second input circuit coupled to the output circuit of the second detector of its corresponding detector pair, and an output circuit; ($n$-2) Type II decision circuits, where n is the number of Type I circuits, each having a first input circuit, a second input circuit, and an output circuit; means coupling the second input circuit of each Type II circuit to the output circuit of one of said Type I circuits except the Type I circuit corresponding to the detector pair corresponding to the oscillator pair coupled to the delay network tap of greatest delay; means connecting the first input circuit of each Type II circuit through a delay network of delay T to the output circuit of the Type II circuit which has its second input circuit coupled to the output of the Type I circuit corresponding to the detector pair corresponding to the oscillator pair coupled to the adjacent delay network tap of lesser delay than the tap similarly associated with the Type I circuit to which the second input of the particular Type II circuit is coupled; a Type III decision circuit having a first input circuit, a second input circuit, and an output circuit; means coupling the second input of said Type III circuit to the output of the Type I circuit corresponding to the detector pair corresponding to the oscillator pair coupled to the delay network tap of greatest delay; and means coupling the first input circuit of said Type III circuit through a delay network of delay T to the output of the Type II circuit which has its second input circuit coupled to the Type I circuit corresponding to the detector pair corresponding to the oscillator pair coupled to the delay network tap preceding the tap of greatest delay, the output circuit of said Type III circuit constituting the output of the decoder; the output vs. input characteristics of said decision circuits being given by the tables Second input

| | | |
|---|---|---|
| – | – | 1 |
| 1 | 0 | u |
| | – | 1 |

First input

TYPE I

Second input

| | | | | |
|---|---|---|---|---|
| – | – | – | – | – |
| 1 | – | 1 | – | 1 |
| 0 | – | – | 0 | 0 |
| u | – | 1 | 0 | u |
| | – | 1 | 0 | u |

First input

TYPE II in which "—" represents no signal, "1" represents a binary "1" signal, "0" represents a binary "0" signal and "u" represents a signal indicating no decision, the characteristics of the Type III circuit being the same as for the Type II circuit except that two "u" inputs produce no output signal.

* * * * *